J. Newton
Securing Cutters to Rotary Discs
Nº 13096      Patented June 19, 1855
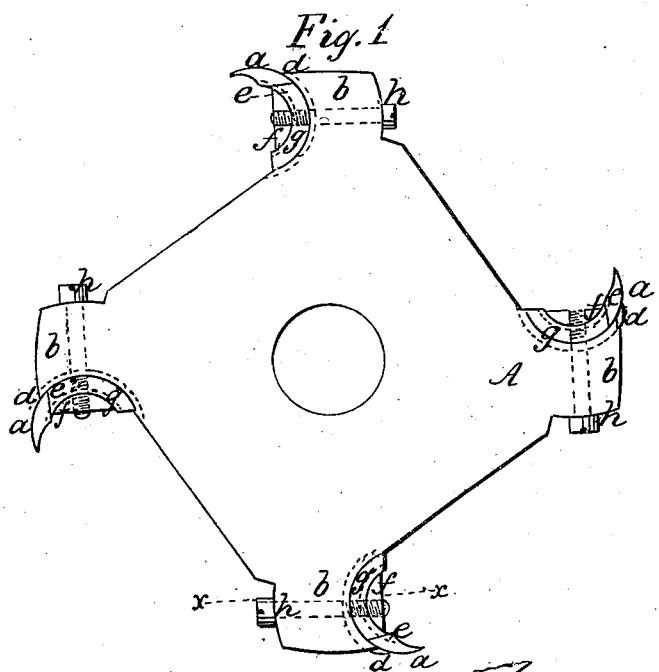
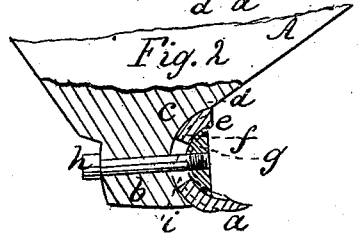
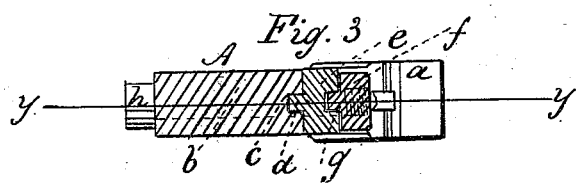

UNITED STATES PATENT OFFICE.

JONAH NEWTON, OF NEW YORK, N. Y.

METHOD OF SECURING CUTTERS TO ROTARY DISKS.

Specification forming part of Letters Patent No. 13,096, dated June 19, 1855; Reissued August 13, 1867, No. 2,728.

*To all whom it may concern:*

Be it known that I, JONAH NEWTON, of the city, county, and State of New York, have invented a new and Improved Mode of Securing Cutters to Rotating Disks or Plates for the Purpose of Cutting Tongues and Grooves, Mortises, &c.; and I do hereby declare that the following is a full, clear, and exact description of the same, reference being had to the annexed drawings, making a part of this specification, in which—

Figure 1, is a side view of the disk or plate with four cutters attached to it. Fig. 2, is a longitudinal section of one of the cutters and a portion of the disk or plate; (y) (y) Fig. 3, shows the plane of section. Fig. 3, is a transverse section of one of the cutters and a portion of the disk or plate; (x) (x) Fig. 1, shows the plane of section.

Similar letters of reference indicate corresponding parts in the several figures.

The nature of my invention consists in attaching the cutters to the disk or plate in a peculiar manner as will be hereafter fully shown and described, whereby the cutters may be adjusted so as to be always in proper position and act upon the wood or stuff at a proper angle.

To enable others skilled in the art to fully understand and construct my invention I will proceed to describe it.

A represents the disk or plate to which the cutters (a) are attached. The disk or plate is hung as usual upon a rotating shaft, and may be as shown in Fig. 1, of square form having a projection (b) at each angle or corner. The front edges of the projections (b) are of semicircular form and have grooves (c) cut in them, one in each, at the centers of the edges, as clearly shown in Figs. 2 and 3.

The cutters (a) are of semicircular form and have each a projection or ledge (d) on their backs or convex sides which are fitted in the grooves (c). The front or concave sides of the cutters (a) have each a groove (e) cut in them in which a segment nut or head (f) fits, the back or convex sides of the nuts having each a ledge or projection (g) which fit in the grooves (e), see Figs. 2 and 3.

Through each of the projections (b) a screw (h) passes, the screws (h) also passing through the cutters (a) and into the nuts or heads f. A slit (i) is made see Fig. 2 through each cutter for the screws to pass through and also to allow a certain degree of play.

The cutters are firmly secured to the projections (b) by the screws (h) as will readily be seen and the cutters cannot move laterally in consequence of the projections or ledges (d) on their backs fitting in the grooves (c) in the front edges of the projections. Now as the cutters are worn by being sharpened, they may be moved outward by relaxing the screws (h) so that the cutting edges will always be in the proper position and act upon the wood or "stuff" at the proper angle, the slots (i) allowing the cutters to be moved outward.

The above invention is extremely simple and the cutters are firmly secured to the disk or plate thereby, the great difficulty at present with the usual forms of attachment is that the cutters work loose not being well supported and firmly secured to the plate or disk.

Having thus described my invention, what I claim as new and desire to secure by Letters Patent, is—

Securing the cutters (a) to the disk or plate A, as herein shown and described, viz., having the cutters of semicircular form with ledges or projections (d) on their back or convex sides, the ledges or projections being fitted in grooves (c) in the semicircular edges of the projections (b) of the plate A, The front or concave sides of the cutters having grooves (e) in them to receive the nuts or segment heads (f). The projections (b) cutters (a) and nuts or heads (f) having screws (h) passing through them, for the purpose of allowing the cutters to be adjusted properly and also securing firmly the cutters to the disk or plate.

JONAH NEWTON.

Witnesses:
 J. W. COOMBS,
 WILLIAM TUSCH.

[FIRST PRINTED 1912.]